United States Patent
Patariu et al.

(10) Patent No.: US 7,912,220 B2
(45) Date of Patent: Mar. 22, 2011

(54) PACKETIZATION OF NON-MPEG STREAM DATA IN SYSTEMS USING ADVANCED MULTI-STREAM POD INTERFACE

(75) Inventors: Kevin Patariu, Hawthorne, NY (US); Dan Simon, San Diego, CA (US); Francis Cheung, Del Mar, CA (US)

(73) Assignee: Broadcom Corporation, Irvine, CA (US)

( * ) Notice: Subject to any disclaimer, the term of this patent is extended or adjusted under 35 U.S.C. 154(b) by 1151 days.

(21) Appl. No.: 10/942,657

(22) Filed: Sep. 16, 2004

(65) Prior Publication Data

US 2005/0177845 A1  Aug. 11, 2005
US 2009/0150923 A9  Jun. 11, 2009

Related U.S. Application Data

(63) Continuation-in-part of application No. 09/969,212, filed on Oct. 2, 2001.

(60) Provisional application No. 60/542,589, filed on Feb. 5, 2004, provisional application No. 60/266,753, filed on Feb. 5, 2001.

(51) Int. Cl.
*H04N 7/167* (2006.01)

(52) U.S. Cl. .......... 380/241; 380/217; 380/239; 725/25; 725/143

(58) Field of Classification Search ............... 380/210, 380/217, 239, 241; 725/25, 31, 143
See application file for complete search history.

(56) References Cited

U.S. PATENT DOCUMENTS

| | | | | |
|---|---|---|---|---|
| 5,689,509 A | * | 11/1997 | Gaytan et al. | 370/396 |
| 5,832,085 A | * | 11/1998 | Inoue et al. | 386/124 |
| 5,838,873 A | * | 11/1998 | Blatter et al. | 386/95 |
| 5,878,135 A | * | 3/1999 | Blatter et al. | 380/239 |
| 5,905,732 A | * | 5/1999 | Fimoff et al. | 370/516 |
| 5,914,962 A | * | 6/1999 | Fimoff et al. | 370/538 |
| 5,933,500 A | * | 8/1999 | Blatter et al. | 380/200 |
| 5,946,052 A | * | 8/1999 | Ozkan et al. | 348/555 |
| 6,016,348 A | * | 1/2000 | Blatter et al. | 380/228 |
| 6,031,577 A | * | 2/2000 | Ozkan et al. | 348/465 |
| 6,115,074 A | * | 9/2000 | Ozkan et al. | 348/465 |
| 6,233,253 B1 | * | 5/2001 | Settle et al. | 370/474 |

(Continued)

OTHER PUBLICATIONS

CableLabs, OpenCable ™ Multi-Stream CableCARD Interface Specification, Sep. 2003.*

(Continued)

*Primary Examiner* — David García Cervetti
(74) *Attorney, Agent, or Firm* — McAndrews, Held & Malloy, Ltd.

(57) ABSTRACT

Aspects of the present invention may be found in one or more systems and/or methods to encapsulate or packetize non-MPEG and MPEG data. The encapsulation or packetization allows both the non-MPEG and MPEG data to be utilized by a set-top-box that conforms or complies with the Open-Cable™ Advanced Multi-Stream POD Interface Specification and/or the OpenCable™ Multi-Stream CableCARD Interface Specification. In one embodiment, a method of processing video data, by a set-top-box that is communicatively coupled to a POD card, comprises receiving video data from a provider, first packetizing the video data using a first header to generate a first packet, wherein the first header comprises a first indicator. In one embodiment, a system for providing MPEG and non-MPEG video to a subscriber comprises a circuitry and a POD card capable of receiving, processing, and facilitating the display of non-MPEG and MPEG data.

22 Claims, 4 Drawing Sheets

U.S. PATENT DOCUMENTS

| | | | |
|---|---|---|---|
| 6,418,169 B1* | 7/2002 | Datari | 375/240.28 |
| 6,421,359 B1* | 7/2002 | Bennett et al. | 370/538 |
| 6,516,137 B1* | 2/2003 | Posch et al. | 386/124 |
| 6,526,583 B1* | 2/2003 | Auld et al. | 725/139 |
| 6,574,417 B1* | 6/2003 | Lin et al. | 386/70 |
| 6,750,918 B2* | 6/2004 | Aneja et al. | 348/569 |
| 6,925,180 B2* | 8/2005 | Iwamura | 380/37 |
| 7,035,335 B1* | 4/2006 | Iacobelli et al. | 375/240.25 |
| 7,089,554 B2* | 8/2006 | Shiomi et al. | 718/1 |
| 7,114,174 B1* | 9/2006 | Brooks et al. | 725/105 |
| 7,133,598 B1* | 11/2006 | Lin et al. | 386/109 |
| 7,194,009 B2* | 3/2007 | Eng | 370/480 |
| 7,200,670 B1* | 4/2007 | Hearn et al. | 709/232 |
| 7,287,268 B1* | 10/2007 | Campbell et al. | 725/94 |
| 7,299,487 B1* | 11/2007 | Campbell et al. | 725/93 |
| 7,336,785 B1* | 2/2008 | Lu et al. | 380/201 |
| 7,409,702 B2* | 8/2008 | Cao | 725/110 |
| 7,535,888 B1* | 5/2009 | Carlucci et al. | 370/352 |
| 2002/0106018 A1* | 8/2002 | D'Luna et al. | 375/240.01 |
| 2002/0113119 A1* | 8/2002 | Bessel et al. | 235/375 |
| 2002/0118953 A1* | 8/2002 | Kim | 386/70 |
| 2002/0136203 A1* | 9/2002 | Liva et al. | 370/352 |
| 2002/0150248 A1* | 10/2002 | Kovacevic | 380/210 |
| 2002/0186775 A1* | 12/2002 | Cordero et al. | 375/240.26 |
| 2002/0197065 A1* | 12/2002 | Cho et al. | 386/111 |
| 2003/0059047 A1* | 3/2003 | Iwamura | 380/201 |
| 2003/0084440 A1* | 5/2003 | Lownes | 725/6 |
| 2003/0196204 A1* | 10/2003 | Thiagarajan et al. | 725/61 |
| 2003/0200548 A1* | 10/2003 | Baran et al. | 725/90 |
| 2003/0208759 A1* | 11/2003 | Gordon et al. | 725/46 |
| 2004/0004977 A1* | 1/2004 | Robbins et al. | 370/535 |
| 2004/0013270 A1* | 1/2004 | Bae et al. | 381/1 |
| 2004/0190629 A1* | 9/2004 | Cooper et al. | 375/240.26 |
| 2004/0221324 A1* | 11/2004 | Ansari et al. | 725/140 |
| 2004/0226049 A1* | 11/2004 | Shiomi | 725/131 |
| 2005/0034123 A1* | 2/2005 | Shiomi et al. | 718/1 |
| 2005/0039212 A1* | 2/2005 | Baran et al. | 725/91 |
| 2005/0080911 A1* | 4/2005 | Stiers et al. | 709/230 |
| 2005/0102702 A1* | 5/2005 | Candelore et al. | 725/100 |
| 2005/0108763 A1* | 5/2005 | Baran et al. | 725/87 |
| 2005/0138401 A1* | 6/2005 | Terao et al. | 713/189 |
| 2005/0169468 A1* | 8/2005 | Fahrny et al. | 380/210 |
| 2006/0153305 A1* | 7/2006 | Guenebaud | 375/240.26 |
| 2009/0128572 A1* | 5/2009 | MacInnis et al. | 345/519 |
| 2009/0138966 A1* | 5/2009 | Krause et al. | 726/21 |

OTHER PUBLICATIONS

Broadcom, BCM7100 Product Brief, 2003, Broadcom.*

CableLabs, OpenCable™ Multi-Stream CableCARD Interface Specification, Sep. 2003.*

Cable Television Laboratories, OpenCable™ HOST-POD Interface Specification IS-POD-131-INT01-991027, Oct. 27, 1999, <http://www.cablelabs.com/specifications/archives/IS-POD-131-INT01-991027.pdf>.*

Cable Television Laboratories, OpenCable™ POD Copy Protection System IS-POD-CP-INT02-000410, Apr. 10, 2000, <http://www.cablelabs.com/specifications/archives/IS-POD-CP-INT02-000410.pdf>.*

Cable Television Laboratories, OpenCable™ POD Copy Protection System IS-POD-CP-INT04-010307, Mar. 7, 2001, <http://www.cablelabs.com/specifications/archives/IS-POD-CP-INT04-010212.pdf>.*

Cable Television Laboratories, OpenCable™ CableCARD™ Interface Specification OC-SP-CC-IF-I14-030905, Sep. 5, 2003, <http://www.cablelabs.com/specifications/archives/OC-SP-CC-IF-I14-030905.pdf>.*

Cable Television Laboratories, OpenCable™ CableCARD™ Copy Protection System Interface Specification OC-SP-CCCP-IF-I12-031121, Nov. 21, 2003, <http://www.cablelabs.com/specifications/archives/OC-SP-CCCP-IF-I12-031121.pdf>.*

Cable Television Laboratories, OpenCable™ Host Device Core Functional Requirements OC-SP-HOST-CFR-I10-020628, Jun. 28, 2002, <http://www.cablelabs.com/specifications/archives/OC-SP-HOST-CFR-I10-020628.pdf>.*

Cable Television Laboratories, OpenCable™ Application Platform Specification OCAP 1.0 Profile OC-SP-OCAP1.0-I04-021028, Oct. 28, 2002, <http://www.cablelabs.com/specifications/archives/OC-SP-OCAP1.0-I04-021028.pdf>.*

Cable Television Laboratories, OpenCable™ System Security Specification, OC-SP-SEC-I01-021126, Nov. 26, 2002, <http://www.cablelabs.com/specifications/archives/OC-SP-SEC-I01-021126.pdf>.*

* cited by examiner

US 7,912,220 B2

PACKETIZATION OF NON-MPEG STREAM DATA IN SYSTEMS USING ADVANCED MULTI-STREAM POD INTERFACE

CROSS-REFERENCE TO RELATED APPLICATIONS/INCORPORATION BY REFERENCE

This application makes reference to and claims priority from United States Provisional Patent Application Ser. No. 60/542,589 entitled "Packetization Of Non-MPEG Stream Data In Systems Using Advanced Multi-Stream POD Interface" filed on Feb. 5, 2004, the complete subject matter of which is incorporated herein by reference in its entirety. The present application is also a continuation-in-part of U.S. application Ser. No. 09/969,212, filed Oct. 2, 2001, which itself makes reference to and claims priority to U.S. Provisional Patent Application Ser. No. 60/266,753 entitled "SINGLE CHIP SET-TOP BOX SYSTEM" filed on Feb. 5, 2001.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Modern set-top-boxes are used to process video received from a cable operator, satellite provider, or other telecommunications carrier. The video provided by such carrier may comprise one or more different types of formatted video. For example, terrestrial systems may utilize MPEG formatted video while satellite systems may utilize non-MPEG formatted video. The non-MPEG video may comprise DirecTV video, for example.

When a set-top-box utilizes an Advanced Multi-Stream POD (point of deployment) card, specified by the OpenCable™ Advanced Multi-Stream POD Interface Specification and/or the OpenCable™ Multi-Stream CableCARD Interface Specification, MPEG data is capable of being processed while non-MPEG data is incapable of being processed by the POD card. As a consequence, only video from terrestrial systems may be capable of being viewed by a subscriber using the set-top-box. This presents a disadvantage to a subscriber, especially when he wishes to obtain both MPEG and non-MPEG video programming using a single set-top-box.

The limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be found in one or more systems and/or methods to encapsulate or packetize non-MPEG and MPEG data. The encapsulation or packetization allows both the non-MPEG and MPEG data to be utilized by a set-top-box that conforms or complies with the OpenCable™ Advanced Multi-Stream POD Interface Specification and/or the OpenCable™ Multi-Stream CableCARD Interface Specification.

In one embodiment, a method of processing video data, by a set-top-box that is communicatively coupled to a POD card, comprises receiving video data from a provider, first packetizing the video data using a first header to generate a first packet, wherein the first header comprises a first indicator. The method further comprises second packetizing the first packet using a second header to generate a second packet, wherein the second packet comprises a second indicator. The method further comprises transmitting the second packet to the POD card, wherein the POD card utilizes the first and the second indicators to control processing performed by the POD card.

In one embodiment, a set-top-box system comprises a circuitry and a POD card capable of receiving, processing, and facilitating the display of non-MPEG and MPEG data. The POD card conforms with the OpenCable™ Advanced Multi-Stream POD Interface Specification and/or the OpenCable™ Multi-Stream CableCARD Interface Specification.

In one embodiment, a method to provide MPEG and non-MPEG video programming to a subscriber comprises first encapsulating any MPEG data received using a 12 byte header to attain one or more 200 byte first packets that conform with the OpenCable™ Advanced Multi-Stream POD Interface Specification and/or the OpenCable™ Multi-Stream CableCARD Interface Specification, second encapsulating any non-MPEG data received using a header and/or trailer to attain a second packet, wherein the second packet comprises an MPEG packet, third encapsulating the second packet using a 12 byte header to attain one or more 200 byte third packets that conform with the OpenCable™ Advanced Multi-Stream POD Interface Specification and/or the OpenCable™ Multi-Stream CableCARD Interface Specification, first processing the one or more first packets and not processing the one or more third packets using a POD card, and second processing the one or more third packets that are not processed by the POD card using a circuitry.

These and other advantages, aspects, and novel features of the present invention, as well as details of illustrated embodiments, thereof, will be more fully understood from the following description and drawings.

DETAILED DESCRIPTION OF THE INVENTION

Aspects of the present invention may be found in a system and method of packetizing or encapsulating non-MPEG data. The packetizing or encapsulation allows the non-MPEG data to be received and utilized by a set-top-box (i.e., digital cable receiver or set-top-terminal) that incorporates an advanced multi-stream point of deployment (AMS-POD) module or card. The set-top-box and AMS-POD card system conforms or complies with the OpenCable™ Advanced Multi-Stream POD Interface Specification and/or the OpenCable™ Multi-Stream CableCARD Interface Specification. Aspects of the present invention facilitate processing of such non-MPEG data by the set-top-box using an advanced multi-stream point of deployment (AMS-POD) module or card. The AMS-POD card (or may be termed a CableCARD) is a device that is inserted or connected to a cable television set-top-box that conforms with the OpenCable Advanced Multi-Stream POD Interface Specification and/or the OpenCable™ Multi-Stream CableCARD Interface Specification. By packetizing or encapsulating the non-MPEG data to create valid MPEG packets, the non-MPEG data may be seamlessly transmitted through the AMS-POD card and back into the set-top-box where processing may be accomplished by circuitry such as an application specific integrated circuit (ASIC).

Various aspects of the present invention allow processing of "mixed-mode" data received by the AMS-POD card (hereinafter termed POD card). The "mixed-mode" data comprises a combination or mixture of MPEG and non-MPEG data packets. Aspects of the invention provide for the receipt and transmission of 100% of the "mixed-mode" data through the POD card. As a consequence, the one or more embodiments presented herein, provide seamless and uninterrupted processing of both non-MPEG and MPEG data streams. The processing of both non-MPEG and MPEG data streams occurs using a single set-top-box. The processing performed by the POD card or the ASIC may provide one or more security related operations including performing one or more user authentication and verification functions. The security related processes may insure that a particular subscriber is authorized to receive the MPEG or non-MPEG video supplied by a video provider (cable operator, satellite provider, or telecommunications carrier). In one embodiment, the security related processes insure that only authenticated subscribers are able to view video content provided by the video provider. One or more aspects of the invention comply with the OpenCable Advanced Multi-Stream POD Interface Specification and/or the OpenCable™ Multi-Stream CableCARD Interface Specifications, each of which may be obtained from Cable Television Laboratories, Inc. (CableLabs®), a non-profit research and development consortium, located in Louisville, Colo., USA. The one or more specifications are incorporated herein by reference in their entireties.

Figure 1:
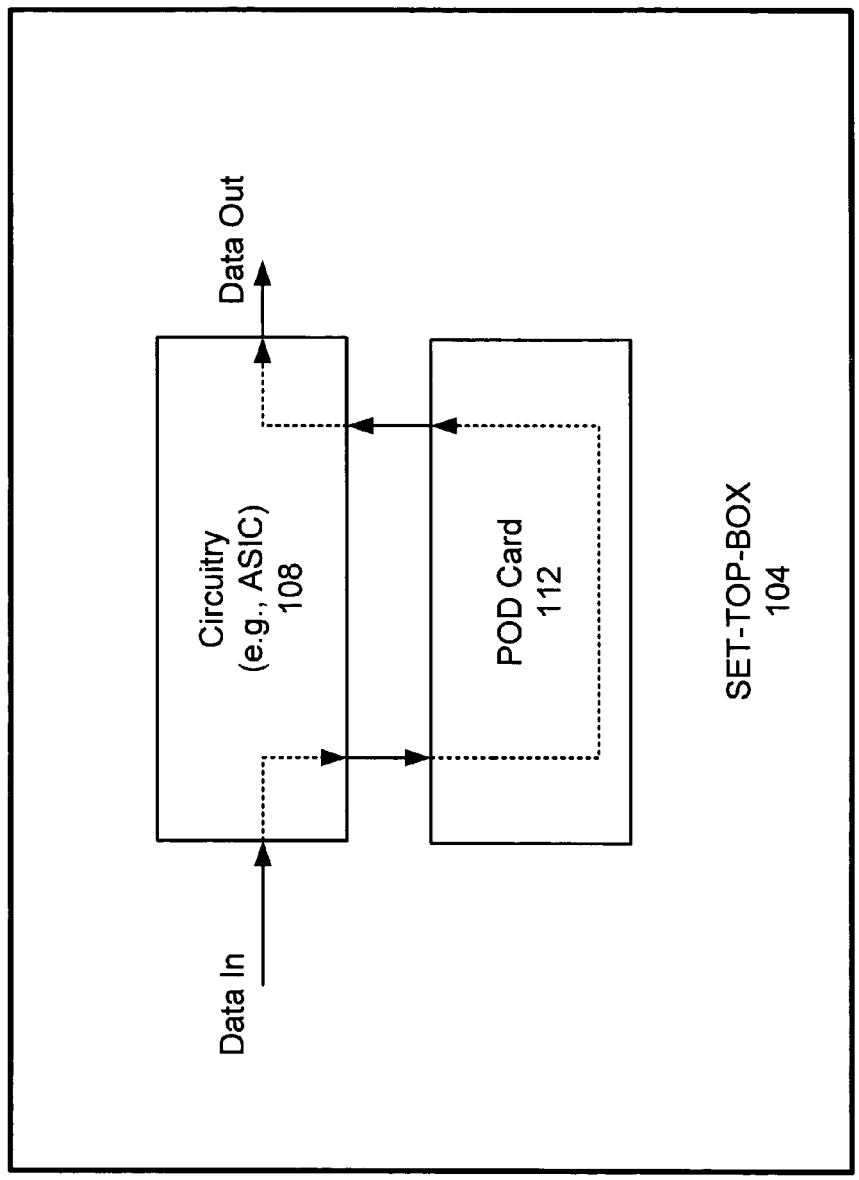
FIG. 1 is a block diagram of a set-top-box in accordance with an embodiment of the invention.

FIG. 1 is a block diagram of a set-top-box (i.e., digital cable receiver or set-top-terminal) 104 in accordance with an embodiment of the invention. The set-top-box 104 comprises a circuitry such as an application specific integrated circuit (ASIC) 108 and a point of deployment card (POD) or module 112. The POD card 112 may comprise an Advanced Multi-Stream POD card (or CableCARD) as specified in the aforementioned OpenCable Interface specifications. The POD card 112 may comprise a PCMCIA card or any other type of portable or detachable device. The POD card 112 may connect to the set-top-box 104 by way of a mating connector. The connector, for example, may comprise a PCMCIA type of connector when the POD card 112 comprises a PCMCIA card. The circuitry (e.g., ASIC) 108 functions to process data streams it receives from a video provider such as a cable operator, satellite provider, or telecommunications carrier. The circuitry (e.g., ASIC) 108 may be configured to perform security related processing and/or operations onto the incoming data it receives. The data it receives from the video provider may comprise non-MPEG or MPEG data. When the data received is non-MPEG data, the circuitry (e.g., ASIC) 108 may add, append, or attach additional data to the one or more incoming data packets it receives, in order to attain 188 byte MPEG packets that conform with the following MPEG specification: ISO/IEC 13818-1 (2000) Information Technology—Generic coding of moving pictures and associated audio information: Systems. By encapsulating the non-MPEG data into a 188 byte MPEG packet, the POD card becomes capable of handling any non-MPEG data it receives. Thereafter, the 188 byte MPEG packet (or encapsulated non-MPEG packet) is further packetized or encapsulated (using an additional 12 bytes) in order to produce a 200 byte packet that conforms to the OpenCable™ Advanced Multi-Stream POD Interface Specification and/or the OpenCable™ Multi-Stream CableCARD Interface Specification. If the data received by the set-top-box 104 comprises MPEG data, the circuitry (e.g., ASIC) 108 may simply append 12 bytes to the 188 byte MPEG packet in order to generate a 200 byte packet that conforms with the OpenCable™ Advanced Multi-Stream POD Interface Specification and/or the OpenCable™ Multi-Stream CableCARD Interface Specification. The circuitry (e.g., ASIC) 108 may comprise logic circuitry capable of packetizing one or more types of received data in order to generate the aforementioned 188 byte or 200 byte sized packets.

In one embodiment, the non-MPEG data comprises DirecTV type of data, occupying 130 bytes. Therefore, in order to generate a valid MPEG packet occupying 188 bytes, the data added, appended, or attached to the incoming data packet(s) comprises a header and/or a trailer occupying 58 bytes. By adding the header/trailer, the DirecTV packet is packetized into the valid MPEG packet that encapsulates the DirecTV data.

The header and/or trailer may comprise a discontinuity flag (i.e., functioning as a first indicator or marker) indicating that the incoming data is of a particular type. In one embodiment, the header and/or trailer may indicate that the type of data is either non-MPEG or MPEG. In one embodiment, the header and/or trailer may indicate that the incoming data is DirectTV type of data. Yet, in another embodiment, the header/trailer may comprise a discontinuity flag used to prohibit processing of the packet's payload (i.e., the 130 byte DirecTV packet). In one embodiment, the header comprises six bytes. In one embodiment, the header comprises the discontinuity flag.

After generating a 188 byte packet (comprising either MPEG or a non-MPEG data), the circuitry (e.g., ASIC) 108 appends a 12 byte header in compliance with the OpenCable™ Advanced Multi-Stream POD Interface Specification and/or the OpenCable™ Multi-Stream CableCARD Interface Specification. This results in a 200 byte packet. The 12 byte header may comprise a second indicator (i.e., in addition to the first indicator provided by the header and/or trailer of the 188 byte MPEG packet) that is used to identify the contents of the 188 byte packet. In one embodiment, the second indicator comprises one byte in the 12 byte header. In another embodiment, the second indicator comprises the first byte in the 12 byte header. The first byte, for example, may comprise an LTSID (local transport stream ID) tag or field. In one embodiment, the POD card 112 may be programmed to disregard or pass through packets associated with one or more values provided by the LTSID tag of a 200 byte packet. In this instance, these packets are not processed at the POD card 112; instead, these packets are passed through to the circuitry (ASIC) 108, in which, processing, such as security related processing, for example, may be performed. The second indicator may be used to determine whether the 188 byte packet, transmitted by the circuitry (ASIC) 108 and received by the POD card 112, comprises a non-MPEG packet or a MPEG packet. In one embodiment, the second indicator defines and determines the type of operation performed on the 188 byte packet. For example, the second indicator may define one of 256 different types of operations. In one embodiment, the second indicator may comprise a pass through operation in which data is simply passed on to the circuitry (e.g., ASIC) 108 for processing. In one embodiment, these operations comprise security related operations. The POD card 112 may be configured to examine the 12 byte header to determine if the 188 byte packet comprises non-MPEG or MPEG data. In one embodiment, if a field within the header, such as an LTSID field, indicates that the received 200 byte packet comprises MPEG data, security related processing is performed by the POD card 112. If, on the other hand, the 188 byte packet comprises non-MPEG data, any security related processes are performed by the circuitry (e.g., ASIC).

In one embodiment, the 188 byte packet is further examined and/or processed by the POD card 112 after the 12 byte header is removed from the 200 byte packet. In one embodiment, the header and/or trailer of the 188 byte packet is examined in order to determine whether the packet is indeed a MPEG packet. In one embodiment, the POD card 112 searches for a discontinuity flag which indicates that the packet is a non-MPEG packet. As stated earlier, the discontinuity flag may comprise six bytes located within the header of the 188 byte packet. The discontinuity flag may be read by the POD card 112 to determine whether to process or disregard (or pass through) the payload of the 188 byte packet. When the discontinuity flag field is set to a particular value, the POD card 112 may initiate one or more security related processing operations on the 188 byte MPEG packet. For example, this may occur when the 188 byte packet contains MPEG data. On the other hand, if it is determined that the 188 byte packet is non-MPEG, the packet is passed on to the circuitry (e.g., ASIC) 108 where one or more appropriate security related processing operations are performed on the non-MPEG data.

Figure 2:
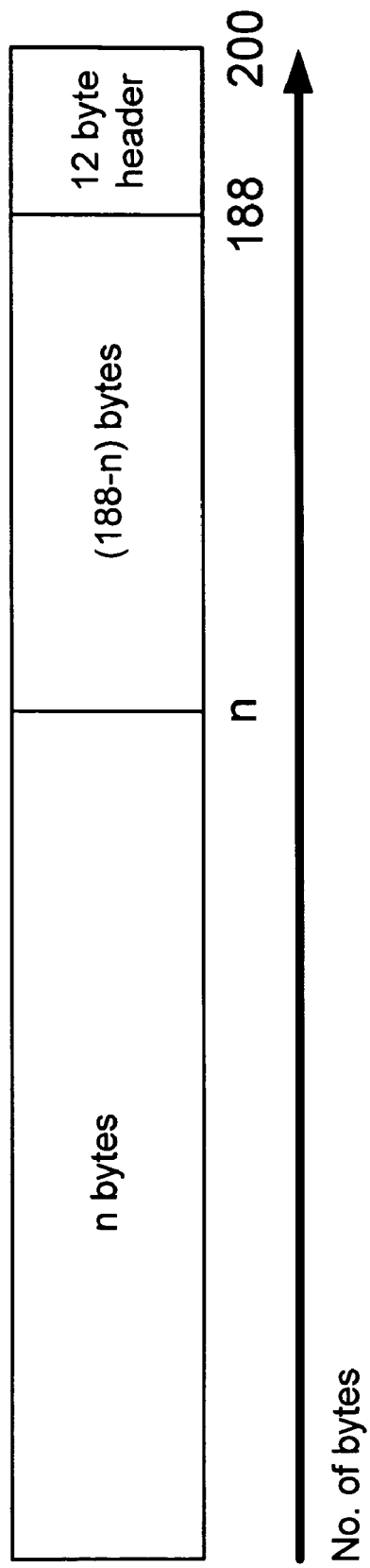
FIG. 2 is a block diagram illustrating encapsulation or packetization of a non-MPEG packet that may be performed by the circuitry (e.g., ASIC) described in relation to FIG. 1, in accordance with an embodiment of the invention.

FIG. 2 is a block diagram illustrating encapsulation or packetization of a non-MPEG packet that may be performed by the circuitry (e.g., ASIC) described in relation to FIG. 1, in accordance with an embodiment of the invention. In this embodiment, the non-MPEG packet comprises n bytes. In one embodiment (e.g., DirecTV packets), n comprises the value 130. As shown, there are (188-n) extra bytes that are added, appended, or attached to the n bytes, by the circuitry (e.g., ASIC), in order to generate an encapsulated (non-MPEG) 188 byte MPEG packet. An additional 12 bytes are appended as shown, by the circuitry (ASIC), in order to generate a 200 byte packet. The following paragraphs describe in more detail, the process in which additional bytes are added to the non-MPEG or MPEG data. The additional bytes may comprise one or more headers and/or trailers added to the non-MPEG or MPEG packet received by the set-top-box from the cable operator, satellite provider, or telecommunications carrier. The one or more headers and/or trailers provide one or more indicators that control processing performed at the POD card or within the circuitry of the set-top-box. For example, one or more security related functions may be performed on the payload of a 188 byte packet received by the POD card.

In one embodiment, a non-MPEG packet is encapsulated by the circuitry (e.g., ASIC) using one or more headers and trailers (stuff bytes of padding) in order to generate a 188 byte MPEG packet. In one embodiment, the headers identify the payload as non-MPEG or MPEG data and as a result, determine whether any processing of the payload is to be performed. Such processing of the payload may include security related processing. If such processing is performed at the circuitry (ASIC), the encapsulated non-MPEG data is passed through back to the circuitry (ASIC), without being processed by the POD card. In one embodiment, the non-MPEG data may comprise DirecTV packets corresponding to DirecTV services, the subject matter of which may be found at DirecTV's website. In one embodiment, a DirecTV packet comprises 130 bytes of data. In one or more embodiments, one or more headers and stuff bytes are positioned along with or appended to or interspersed within the non-MPEG data packet in order to generate an MPEG packet containing the DirecTV packet. In one embodiment, the MPEG packet comprises 188 bytes. In one embodiment, the one or more headers of the 188 byte packet comprise a discontinuity flag (used as a first indicator or marker) effectuating an appropriate processing of its non-MPEG payload by either the circuitry (ASIC) or the POD card. In one embodiment, the packet structure of the 188 byte MPEG packet comprises the following:

47—byte 1 sync
1f—byte 2 pid high
ff—byte 3 pid low
20—byte 4 all adaptation
b7—byte 5 adaptation len
80—byte 6 discontinuity flag
00—byte 7 to n original non-MPEG packet
00—byte n+1 to 188 padding As indicated in the packet structure above, the first six bytes comprise a set of bytes that incorporates a discontinuity flag while the remaining 7 to n bytes correspond to the non-MPEG payload portion of the MPEG packet. Bytes n+1 through 188 comprise stuff bytes or padding. In one embodiment the variable n corresponds to the value 130 when one or more DirecTV packets are received by the circuitry (ASIC) in the set-top-box. As a consequence, bytes 7 to 136 are reserved for use by the DirecTV packet. In one embodiment, the payload is identified as non-MPEG when the discontinuity flag (byte #6) is set; as a result, the non-MPEG data passes through to the circuitry (e.g., ASIC) where processing occurs. In one embodiment, as may be described in the exemplary packet structure shown above, the header is located within the first six bytes of a 188 byte MPEG packet. The headers and padding encapsulate or packetize a non-MPEG packet in order to "spoof" or "fool" the POD card.

A 188 byte MPEG packet may be further padded with an additional 12 byte header in an operation that is performed by the circuitry (e.g., ASIC), generating a 200 byte packet. This 12 byte header comprises an LTSID tag or identifier that may be used by the POD card and the circuitry (e.g., ASIC) to further identify and/or appropriately treat the encapsulated 188 byte packet as either a non-MPEG packet or MPEG packet. Each 188 byte packet generated by the circuitry (ASIC) is padded with a 12 byte header prior to transmission to the POD card. The 12 bytes that are added to a 188 byte MPEG packet create a 200 byte packet that complies with the OpenCable™ Advanced Multi-Stream POD Interface Specification and/or the OpenCable™ Multi-Stream CableCARD Interface Specification. When the received data comprises non-MPEG data, such as DirecTV data, for example, the non-MPEG data may be encapsulated to form a 188 byte MPEG packet in order to facilitate processing or handling by the POD card. In one embodiment, the LTSID tag identifies the processing device that performs the processing and/or the type of processing to be performed on its 188 byte packet. Processing, such as security related processing, may be performed, for example, by the POD card if the 188 byte packet is associated with MPEG data. In one embodiment, the LTSID tag may be configured to a value such that the 188 byte packet is treated as MPEG data. In such an instance, processing (e.g, security related processing) of the 188 byte packet is performed at the POD card. In another embodiment, the LTSID is configured to a value such that the non-MPEG data bypasses any processing performed by the POD card. Instead, the POD card transparently passes or returns the non-MPEG data back to the circuitry (ASIC) where processing is performed. In one embodiment, the processing at the POD card or circuitry (e.g., ASIC) may comprise one or more encryption and/or decryption operations. In one embodiment, the LTSID tag may be configured to a value that indicates the type of security processing used and the devices used to perform the processing.

In one or more embodiments, the POD card may be programmed to identify the LTSID tag in each packet it receives in order to perform one or more specific security functions and/or operations. The bits for each LTSID tag may be configured to a specific value such that the POD card may appropriately recognize and perform one or more specific operations. In one embodiment, the LTSID may be used to specify one of 256 different types (e.g., using 8 bits) of possible operations. It is contemplated that one or more of these operations comprises security related operations that involve subscriber authentication and/or verification.

Figure 3A:
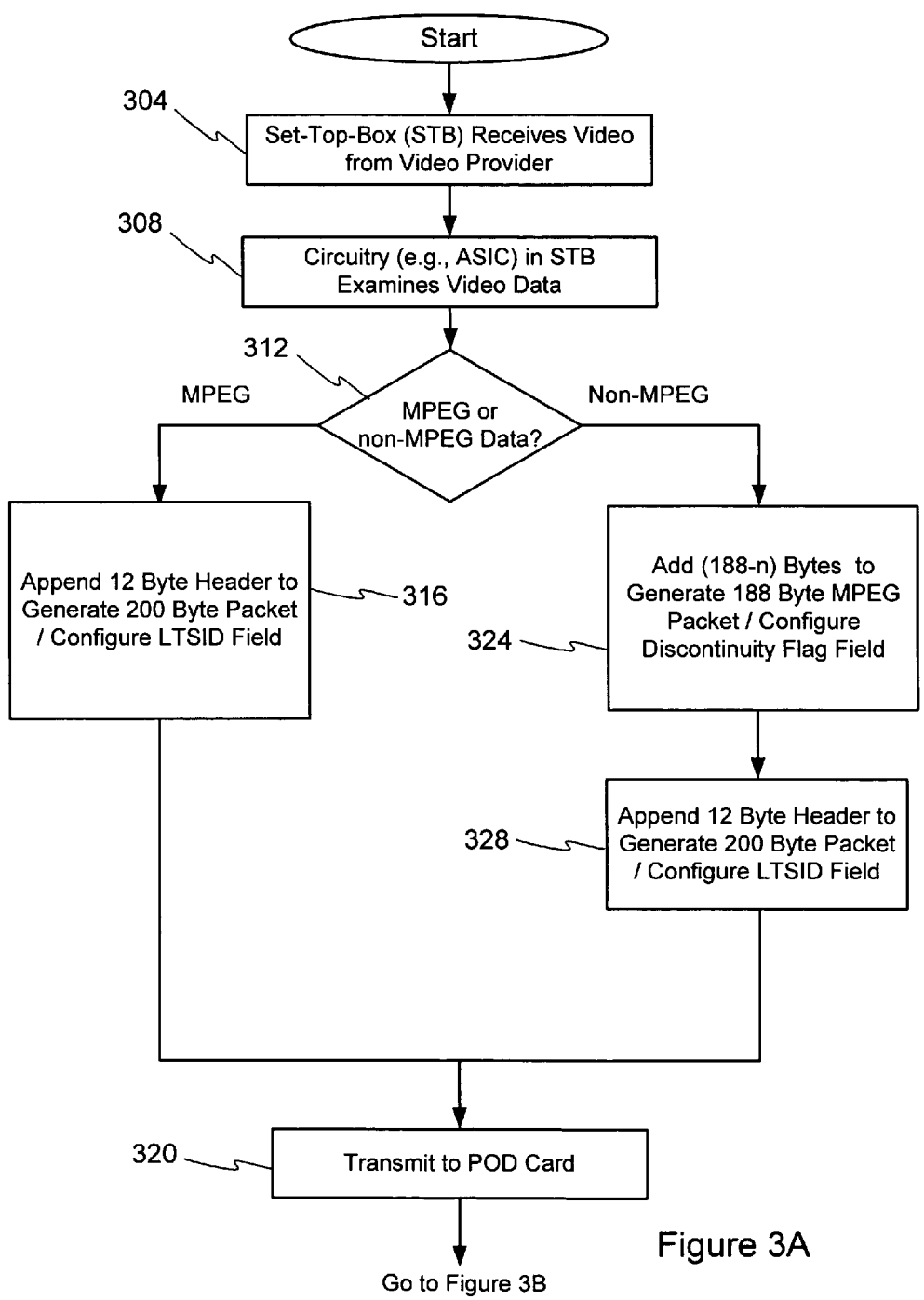
FIG. 3A is an operational flow diagram illustrating a method of processing MPEG and non-MPEG data packets, performed by a circuitry, such as the application specific integrated circuit (ASIC) previously described in relation to the embodiment of FIG. 1, in accordance with an embodiment of the invention.

FIG. 3A is an operational flow diagram illustrating a method of processing MPEG and non-MPEG data packets, performed by a circuitry, such as the application specific integrated circuit (ASIC) previously described in relation to the embodiment of FIG. 1, in accordance with an embodiment of the invention. The MPEG and non-MPEG data packets are provided by a video provider (such as a cable operator, satellite provider, or telecommunications carrier) to a set-top-box (such as a digital cable receiver or set-top-terminal) that utilizes the circuitry (ASIC), in accordance with an embodiment of the invention. At step 304, the set-top-box (STB) receives video from the video provider. The video received from the video provider may comprise MPEG and/or non-MPEG video. Next, at step 308, the circuitry, such as logic circuitry implemented using an application specific integrated circuit, for example, processes the received video data. After processing, at step 312, the circuitry determines whether the received video comprises MPEG or non-MPEG data. If the video data comprises one or more 188 byte MPEG packets, the process proceeds with step 316. At step 316, a 12 byte header is appended to each of the 188 byte MPEG packets. The 12 byte header comprises an LTSID field whose value is appropriately configured. The value may comprise an 8 bit value (one byte) that may select one of 256 possible operations which may be performed by a POD card. The value configured into the LTSID field may indicate to the POD card that the packet's payload comprises MPEG data. The LTSID field may comprise one byte, such as the first byte, within the 12 byte header. The 12 byte header is appended to the 188 byte MPEG packet in order to attain a 200 byte packet that conforms to the OpenCable™ Advanced Multi-Stream POD Interface Specification and/or the OpenCable™ Multi-Stream CableCARD Interface Specification. Thereafter, at step 320, the 200 byte packet is transmitted to the POD card, where processing may occur. Referring back to step 312, if the circuitry determines that the received video comprises one or more non-MPEG packets, the process proceeds with step 324. At step 324, (188-n) bytes are added to the one or more non-MPEG packets in order to attain one or more 188 byte MPEG packets. The (188-n) bytes may comprise a discontinuity flag field, of which the discontinuity flag field may comprise 6 bytes. As described previously, the discontinuity field flag may be configured to indicate to the POD card that its associated payload comprises non-MPEG data. As a consequence, processing of the non-MPEG data may be bypassed by the POD card and performed instead at the circuitry (e.g., ASIC) of the STB. At step 328, a 12 byte header is appended to each of the 188 byte MPEG packets, thereby generating a 200 byte packet. The 12 byte header may comprise an LTSID field whose value may be appropriately configured. The value may comprise an 8 bit value (one byte) that may select one of 256 possible operations that may be performed by a POD card. The value configured into the LTSID field may indicate to the POD card that the video payload which follows comprises non-MPEG data. The LTSID field may comprise one byte, such as the first byte, within the 12 byte header. The header is appended to the 188 byte MPEG packet in order to attain a 200 byte packet that conforms to the OpenCable™ Advanced Multi-Stream POD Interface Specification and/or the OpenCable™ Multi-Stream CableCARD Interface Specification. Thereafter, at step 320, the 200 byte packet is transmitted to the POD card, where additional processing may occur.

Figure 3B:
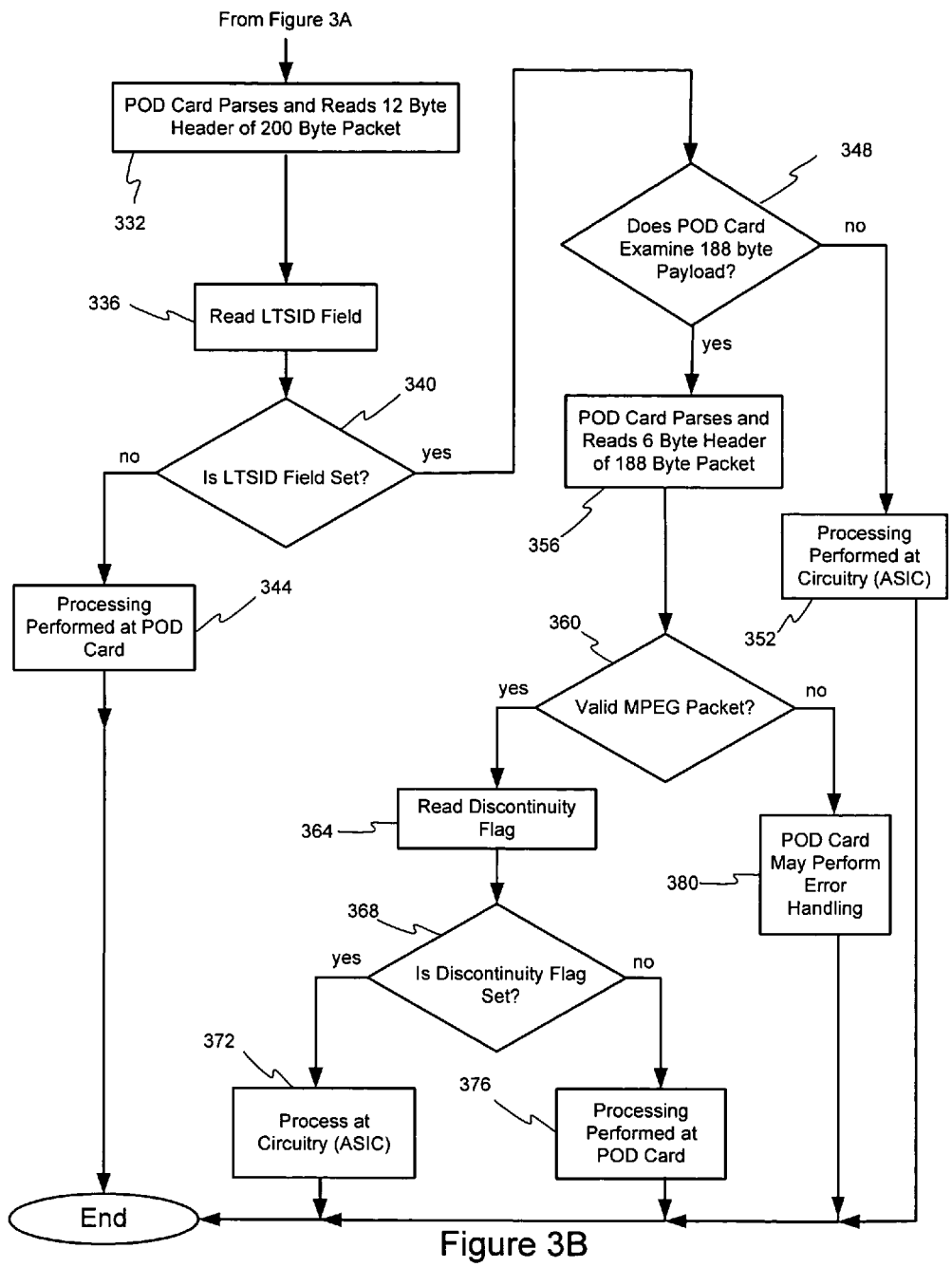
FIG. 3B is an operational flow diagram illustrating a method of processing MPEG and non-MPEG video data that has been packetized into 200 byte packets by the circuitry (e.g., ASIC) of the set-top-box (STB) described in relation to FIG. 1, in accordance with an embodiment of the invention.

FIG. 3B is an operational flow diagram illustrating a method of processing MPEG and non-MPEG video data that has been packetized into 200 byte packets by the circuitry (e.g., ASIC), of the set-top-box (STB), described in relation to FIG. 1, in accordance with an embodiment of the invention. At step 332, a POD card of the STB parses and reads a 12 byte header that encapsulates each 188 byte MPEG packet. At step 336, the POD card determines whether an LTSID field is present within the parsed header. If an LTSID field is present, the LTSID field is read by the POD card. At step 340, the POD card determines whether the LTSID field is set to an appropriate value. If the LTSID field is not set, processing is performed at the POD card, as indicated at step 344. The processing, such as security related processing, may be performed at the POD card. The security related processing may involve user authentication and/or verification. Otherwise, the process continues with step 348. At step 348, the POD card may examine the remaining 188 byte payload or 188 byte packet. In a representative embodiment, the POD card may examine the 188 byte packet to determine if it comprises a valid MPEG packet (i.e., whether the packet conforms to ISO/IEC 13818-1 (2000) Information Technology—Generic coding of moving pictures and associated audio information: Systems). If at step 348, the POD card is configured to examine the 188 byte payload, the process continues with step 356. Otherwise, if the POD card is configured to not examine the 188 byte payload, the next step continues with step 352, at which, the packet is processed by the ASIC. (It is contemplated that certain POD cards may be capable of further examining the 188 byte packet, even after it is determined that processing at the POD card should be bypassed, by way of using the LTSID field.) At step 356, the POD card parses and reads the header of the 188 byte packet. The header of the 188 byte packet, as previously described, may comprise a discontinuity flag which utilizes 6 bytes. Next, at step 360, the POD card determines whether the 188 byte packet constitutes a valid MPEG packet. If the packet is a valid MPEG packet, then the next operation occurs at step 364, at which the discontinuity flag is read from a 6 byte discontinuity flag field. The discontinuity flag field may provide a value that determines whether its associated payload is processed at the POD card or at the circuitry (ASIC) of the STB. At step 368, the POD card determines whether to bypass processing of the packet's payload to the circuitry (e.g., ASIC) of the STB or to perform processing at the POD card, after reading the 6 byte discontinuity flag field. The processing may involve security related processing such as user authentication and/or verification. At step 372, the processing is performed at the circuitry (ASIC) if the discontinuity flag field is set to an appropriate value. If the discontinuity flag field is not set to an appropriate value, processing is performed at the POD, as shown in step 376. If, at step 360, it is determined that the 188 byte packet is an invalid MPEG packet, the next step commences with step 380. At step 380, the POD card may perform one or more error handing operations. The POD card may perform one or more error handling operations or error checking functions, as a means for detecting communication errors, for example. The one or more error checking functions may comprise a verification of packet length, for example. It is contemplated that certain POD cards may be capable of performing such error handing operations. In another representative embodiment, one or more error handling operations may be incorporated into steps 332, 336, and/or 340. The error handling operations may comprise verifying the length and contents of the 200 byte packet received by the POD card, for example.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of processing video data by a set-top-box comprising:
    first packetizing said video data if said video data comprises non-MPEG (non-Moving Pictures Experts Group) data, said first packetizing performed by appending a first header to generate a first packet comprising a MPEG (Moving Pictures Experts Group) packet, said first header comprising a first indicator;
    second packetizing said first packet using a second header to generate a second packet, said second packet comprising a second indicator;
    third packetizing said video data if said video data comprises MPEG data, said third packetizing performed by appending a third header to generate a third packet, said third header comprising a third indicator; and
    transmitting said second and third packets to a portable card, said set-top-box communicatively coupled to said card, said card utilizing said first, second, and third indicators to facilitate security processing performed by said card or a circuitry, said circuitry located within said set-top-box.

2. The method of claim 1 wherein said security processing comprises user authentication and/or verification operations performed on said MPEG and non-MPEG data.

3. The method of claim 1 wherein said first indicator comprises a discontinuity flag used for determining whether processing is performed at said card or at said circuitry, wherein said processing performs user authentication and verification.

4. The method of claim 3 wherein said processing is performed by said card if said discontinuity flag is not set.

5. The method of claim 3 wherein said processing is performed by said circuitry if said discontinuity flag is set.

6. The method of claim 1 wherein said second indicator comprises an LTSID (local transport stream identification) field.

7. The method of claim 6 wherein security processing is performed by said circuitry located within said set-top-box by way of control provided by said LTSID field.

8. The method of claim 7 wherein said LTSID field generates a maximum of 256 types of security related operations.

9. The method of claim 1 wherein said circuitry comprises an application specific integrated circuit (ASIC).

10. The method of claim 1 wherein said second packet and said third packet each comprise 200 bytes.

11. The method of claim 1 wherein said first packet comprises 188 bytes.

12. The method of claim 1 wherein said MPEG and non-MPEG data is received from a cable operator, satellite provider, or telecommunications carrier.

13. A system for providing MPEG and non-MPEG video to a subscriber comprising:
    a first circuitry in a set-top-box, operable for, at least:
        determining whether one or more data packets received by said set-top-box comprises one or more MPEG data packets or one or more non-MPEG data packets,
        first appending a first header to said one or more non-MPEG data packets to generate one or more MPEG sized data packets,
        configuring a field in said first header to indicate that said MPEG sized data packets comprises a non-MPEG data payload, second appending a second header to each of said one or more MPEG data packets and said one or more MPEG sized data packets to generate one or more desired data packets, said second header comprising an LTSID field set to a specified value, and
        transmitting said one or more desired data packets to a second circuitry capable of being portably inserted into said set-top-box, said second circuitry operable for, at least:
            parsing and reading said second header of said each of said one or more desired data packets,
            determining whether said LTSID field is present in said 12 byte header,
            reading said LTSID field to determine if said LTSID field is set to said specified value, and
            first processing said one or more desired data packets by said second circuitry if said LTSID field is not set to said specified value, said first processing comprising user authentication and verification.

14. The system of claim 13 wherein said first circuitry comprises an application specific integrated circuit (ASIC).

15. The system of claim 13 wherein said second header comprises 12 bytes.

16. The system of claim 15 wherein each of said one or more desired data packets comprises a 200 byte packet.

17. The system of claim 13 wherein said second circuitry is further operable for, at least:
    parsing and reading said first header of each of said one or more MPEG and MPEG sized data packets if said LTSID field is set to said specified value;
    determining whether each of said one or more MPEG and MPEG sized data packets comprises a valid MPEG data packet;
    reading a field of said first header to determine if a flag has been set;
    transmitting said one or more desired data packets to said first circuitry if said flag has been set, wherein said first circuitry performs said user authentication and said verification; and otherwise, second processing said one or more desired data packets by said second circuitry if said flag has not been set, wherein said second processing comprises said user authentication and said verification.

18. A method to provide MPEG and non-MPEG video programming to a subscriber comprising:
first encapsulating MPEG packets received using 12 byte headers to attain one or more 200 byte first packets;
second encapsulating any non-MPEG packets received using headers and/or trailers to attain one or more second packets, each of said one or more second packets comprising one or more MPEG sized packets;
third encapsulating said one or more second packets using 12 byte headers to attain one or more 200 byte third packets;
first processing said one or more first packets and not processing said one or more third packets using a card insertable into a set-top-box; and
second processing said one or more third packets that are said not processed by said card using a circuitry resident in said set-top-box.

19. The method of claim 18 wherein said first and second processing comprises security related processing.

20. The method of claim 19 wherein said security related processing comprises subscriber authentication and/or verification.

21. A system for processing mixed mode video data packets comprising:
a first circuitry capable of being portably inserted into a set-top-box, operable for, at least:
parsing said mixed mode video data packets,
reading 12 byte headers of said mixed mode video data packets,
determining whether an LTSID field is present in said 12 byte header,
reading said LTSID field to determine if said LTSID field is set to a specified value,
first processing a portion of said mixed mode video data packets by said first circuitry if said LTSID field is not set to said specified value, and
second processing a remainder of said mixed mode video data packets by a second circuitry resident in said set-top-box if said LTSID field is set to said specified value.

22. The system of claim 21 wherein each of said modified mixed mode video data packets that are not processed by said first circuitry comprises 130 bytes.

* * * * *